United States Patent Office 3,661,829
Patented May 9, 1972

3,661,829
AQUEOUS SULFO MODIFIED MELAMINE-FORMALDEHYDE RESIN COMPOSITION CONTAINING MULTIVALENT OXIDES
Alois Aignesberger and Horst Michaud, Trostberg, Germany, assignors to Suddentsche Kalkstickstoff-Werke AG, Trostberg, Germany
No Drawing. Filed May 6, 1970, Ser. No. 35,259
Int. Cl. C08g 9/30, 51/04
U.S. Cl. 260—29.4 R                2 Claims

ABSTRACT OF THE DISCLOSURE

An aqueous solution of a melamine-formaldehyde resin containing enough sulfo groups to be water soluble combined with one or more basic or amphoteric oxides or hydroxides of trivalent or quadrivalent metals is a strong binder for sand, cement, and the like.

---

This invention relates to binders, and particularly to binders having a synthetic polymer component and an inorganic oxide component.

In its more specific aspects, the invention is concerned with binders of the general type described in which the polymer component is a melamine-formaldehyde resin modified by means of sulfites or sulfonates to contain sulfo groups in an amount sufficient to make the modified resin water soluble.

The modified, water soluble melamine-formaldehyde resins have been proposed heretofore as binders for cementitious materials such as lime, cement, or plaster. It has now been found that the resins produce greatly improved bonds when used in conjunction with basic or amphoteric oxides and hydroxides of trivalent or quadrivalent metals.

Typical oxides which may be used in the binders of the invention in the anhydrous or hydrated condition, that is, as hydroxides, include $Al_2O_3$, $TiO_2$, $Fe_3O_4$, $Cr_2O_3$, $Pb_3O_4$, and the oxides of the rare earth metals. They may be present in the binders partly in the form of cements, such as portland cement or high alumina cement, 97.5% oxide or hydroxide in the form of cement being the normal limit at which significant beneficial results can be found.

The ratio resin to oxide or hydroxide may vary within wide limits, best results usually being achieved at ratios between 1:25 and 2:1.

The binders of the invention have been used successfully in the preparation of shaped bodies from granular material, such as foundry cores and linings for permanent foundry molds. The binder is intimately mixed with the granular filler, and the mixture so obtained is shaped under pressure and dried.

Good results have also been achieved with the binders of the invention in adhesively connecting structural elements such as bodies of aerated concrete. When the oxides employed are colored, as the chromium and iron oxides are, pigmented cementitious bodies of great mechanical strength are readily produced.

The resins employed in the binders of the invention are prepared in a known manner from melamine and formaldehyde, and modified by reaction with sulfonating agents, such as sodium metabisulfite or sulfamic acid to produce —$SO_3H$ groups, one —$SO_3H$ group per melamine radical being normally sufficient to produce the desired solubility in water. The condensation reaction between the melamine and the formaldehyde is carried out until the mixture reaches a desired viscosity, generally between 10 and 150 centipoise at 20° C., and the condensation product is then sulfonated to produce —$CH_2$—$SO_3H$ or —$CH_2$—NH—$SO_3H$ groups. As a general rule, resins having a high viscosity are employed most successfully with relatively large amounts of free oxides or hydroxides and small amounts of cement, whereas resins of lower viscosity are best suited for binders containing a relatively small amount of free oxides or hydroxides and much cement.

The following examples are further illustrative of the invention, and it will be understood that the invention is not limited thereto. All parts and percentages are by weight unless stated otherwise.

EXAMPLE 1

567 parts 37% formaldehyde solution were adjusted to pH 4.5 with sodium hydroxide, and 294 parts melamine were added. The mixture was heated to 80° C. until a clear solution was formed. The solution was cooled to 45° C., and 222 parts sodium metabisulfite, $Na_2S_2O_5$, were added and followed by 332 parts water and enough sodium hydroxide to adjust the pH to 10.5. The solution so obtained was heated to 80° C. for two hours, and cooled to 50° C. 750 parts concentrated sulfuric acid diluted with 2116 parts water were added, and the resulting mixture was kept for ten hours at 50° C., whereupon it was adjusted to pH 9.5 with sodium hydroxide.

The liquid obtained was miscible with water in all proportions. It contained 20% solids and had a viscosity of 81 centipoise as determined with a Brookfield viscosimeter at 20 r.p.m. at 20° C.

EXAMPLE 2

A mixture of 400 parts aqueous 30% formaldehyde solution having a pH of 8.2 was stirred with 126 parts melamine and heated to 80° C. until a clear solution was obtained. The solution was heated to its boiling point, there was added a solution of 97 parts sulfamic acid in enough dilute sodium hydroxide solution to make the pH 7.2, and heating was continued for five minutes. The mixture was then cooled while 500 parts water were admixed.

The solution so obtained was miscible with water in all proportions, contained about 27% solids, and had a viscosity of 14 centipoise determined as in Example 1.

EXAMPLE 3

567 parts 37% aqueous formaldehyde were adjusted with sodium hydroxide to pH 4.0, and 294 parts melamine were added. The mixture was heated to 75° C. to produce a clear solution which was cooled to 45° C. 222 parts sodium metabisulfite were added, and thereafter 332 parts water, whereupon the reaction mixture was adjusted to pH 10.5, and heated to 80° C. for two hours. After cooling to 50° C., 70 parts concentrated sulfuric acid diluted with 2116 parts water were added, and the resulting mixture was heated to 50° C. for four hours, and then adjusted to pH 9.0 with sodium hydroxide.

The liquid so obtained was miscible with water in all proportions, had a solids content of 20%, and a viscosity of 13 centipoise at 20° C. as determined with the afore-mentioned viscosimeter.

EXAMPLE 4

Specimens of shell mold linings were prepared from silica sand, saw dust, inorganic oxides or hydroxides, and the synthetic resin solution prepared in Example 1 and are listed in Table 1. One set of each composition was dried for 5–10 hours at 80° C. and 2–4 hours at 120° C. Another set was stored for one week at about 20° C. Specimens from each set were subjected to the bending test of the German Industrial Standard DIN 1164. Table 1 lists the results of the bending tests in kg./cm.$^2$.

The added oxides or hydroxides are identified in Table 1 by capital letters as follows:

(A) Aluminum hydroxide containing 99%+ Al(OH)$_3$.
(B) Greek bauxite: 52.0% Al$_2$O$_3$, 22.5% Fe$_2$O$_3$, 5.3% SiO$_2$, 15.5% loss on ignition.
(C) Surinam bauxite: 60.3% Al$_2$O$_3$, 1.8% Fe$_2$O$_3$, 4.6 SiO$_2$, 31.5% loss on ignition.
(D) Calcined bastnesite: 90.2% rare earth oxides (about 25% La$_2$O$_3$, 40% CeO$_2$, 20% Pr$_2$O$_3$ and Nd$_2$O$_3$, 5% Sm$_2$O$_3$, balance oxides of Y and Th), 3.9% F, 0.7% loss on ignition.
(E) Titania: at least 99% TiO$_2$.
(F) Converter dust: 84.3% Fe$_2$O$_3$, 8.7% CaO, 1.3% SiO$_2$, 1.7% loss on ignition.

TABLE 1

| Sand, parts | Saw-dust, parts | Oxide or hydroxide | Parts | Resin solution, parts | Bending strength, kg./mm.$^2$ at 120° C. | 20° C. |
|---|---|---|---|---|---|---|
| 350 | 100 | A | 200 | 400 | 9 | 10 |
| 275 | 50 | B | 80 | 150 | 13 | 11 |
| 275 | 50 | B | 150 | 150 | 14 | 18 |
| 350 | 100 | C | 100 | 400 | 21 | 14 |
| 350 | 100 | C | 200 | 400 | 19 | 11 |
| 350 | 100 | C | 300 | 400 | 18 | 16 |
| 350 | 100 | D | 100 | 400 | 12 | 11 |
| 350 | 100 | D | 200 | 400 | 14 | 9 |
| 350 | 100 | E | 100 | 200 | 11 | 7 |
| 350 | 100 | E | 100 | 400 | 21 | 11 |
| 350 | 100 | E | 200 | 200 | 11 | 7 |
| 350 | 100 | E | 200 | 400 | 17 | 15 |
| 350 | 100 | F | 75 | 250 | 13 | 12 |
| 350 | 100 | F | 150 | 250 | 12 | 8 |

When specimens from the several sets were tested in an iron foundry in actual use, they were found satisfactory in their properties when in contact with the molten metal. They did not produce a strong unpleasant odor, and no hydrogen cyanide could be detected. They did not lose weight to a significant extent by melting, and they did not or did not significantly react with the molten metal, as would be indicated by gas development and "boiling" of the melt.

EXAMPLE 5

Plates of dry, aerated concrete having a compressive strength of 25 kp./cm.$^2$ were coated with thin layers of the binder compositions listed in Table 2, and a second plate of the same dry aerated concrete was held against each coated surface with light pressure for about 20 hours. The bonded structures so obtained were tested to destruction. At least 30% of the fracture in each case occurred within one of the concrete pieces, not in the bond.

All but two binder compositions contained 50 parts portland cement (P) or high alumina cement (Q), the indicated amount of resin solution, as prepared in Example 1 or 2 and contributing up to 40% water, and an oxide or hydroxide identified partly by capital letters as in Table 1 with the following addition:

(G) Red mud: 51.1% Fe$_2$O$_3$, 16.5% Al$_2$O$_3$, 7.4% TiO$_2$, 7.2% SiO$_2$, 1.4% CaO, 10.0% loss on ignition.

TABLE 2

| Cement | Oxide or hydroxide | Parts | Resin solution | Parts |
|---|---|---|---|---|
| None | A | 100 | Example 1 | 50 |
| Do | G | 100 | do | 25 |
| P | A | 50 | do | 50 |
| P | G | 50 | do | 50 |
| P | B | 50 | do | 25 |
| Q | A | 50 | do | 50 |
| Q | A | 50 | do | 100 |
| Q | G | 50 | do | 50 |
| P | A | 50 | Example 2 | 20 |
| P | A | 50 | do | 40 |
| Q | B | 50 | do | 40 |

Control specimens prepared in an otherwise identical manner without the resin did not show appreciable bond strength.

EXAMPLE 6

Specimens were prepared from white portland cement and various amounts of water, chromium sesquioxide, and of the resin solution prepared in Example 3. The procedure followed was generally that of German Industrial Standard DIN 1164. The specimens had dimensions of 4 x 4 x 16 cm. and a slump test value of 18±1 cm. They were packed tight in respective molds on a shock table according to the proposed international standard RILEM—CEM, unmolded after one day, and stored in a controlled atmosphere at 20° C. at 65% relative humidity.

Table 3 lists the additions of resin solution, of chromium sesquioxide and of water used in percent based on the weight of the portland cement, and the results of bending tests and of compression tests in kp./cm.$^2$, as determined after 1, 7, and 28 days.

The superior effects achieved by the simultaneous addition of the chromium sesquioxide and of the resin are evident.

TABLE 3

| Resin solution percent | Cr$_2$O$_3$, percent | Water, percent | Bending strength, kp./cm.$^2$ after— | | | Compress. strength, kp./cm.$^2$ after— | | |
|---|---|---|---|---|---|---|---|---|
| | | | 1 day | 7 days | 28 days | 1 days | 7 days | 28 days |
| 0 | 0 | 50 | 34 | 51 | 62 | 195 | 374 | 420 |
| 5 | 0 | 42 | 55 | 74 | 82 | 380 | 576 | 639 |
| 10 | 0 | 41 | 51 | 78 | 76 | 350 | 573 | 554 |
| 0 | 2.5 | 52 | 32 | 60 | 61 | 160 | 403 | 454 |
| 5 | 2.5 | 43 | 54 | 84 | 84 | 385 | 639 | 664 |
| 10 | 2.5 | 40 | 56 | 83 | 104 | 355 | 642 | 699 |

What is claimed is:

1. A binder composition consisting essentially of
   (a) a melamine formaldehyde resin modified to contain one sulfo group per melamine radical and water soluble;
   (b) a basic or amphoteric oxide of at least one trivalent or quadrivalent metal selected from the group consisting of aluminum, titanium, iron, chromium, lead, and the rare earth metals; and
   (c) an amount of water up to 40% and sufficient to dissolve said resin,
   the ratio of said resin to said oxide being between 1:25 and 2:1.

2. A composition as set forth in claim 1, wherein up to 97.5% of said oxide is a constituent of portland cement and is present in said composition in the form of said portland cement.

References Cited

UNITED STATES PATENTS

| | | | |
|---|---|---|---|
| 2,539,446 | 1/1951 | Lies | 260—39 M UX |
| 2,863,842 | 12/1958 | Bonzagni | 260—67.6 X |
| 2,711,219 | 6/1955 | Salathiel | 106—90 UX |
| 3,216,966 | 11/1965 | Collins | 106—90 X |
| 3,465,824 | 9/1969 | Kucera | 106—90 X |
| 2,407,599 | 9/1946 | Auten et al. | 260—29.4 UX |
| 2,840,483 | 6/1958 | Morgan et al. | 106—90 X |
| 2,798,003 | 7/1957 | Morgan et al. | 106—90 |

DONALD J. ARNOLD, Primary Examiner

J. B. LOWE, Assistant Examiner

U.S. Cl. X.R.

106—90; 260—39 M, 39 P